United States Patent [19]
Schwarz

[11] 3,829,693
[45] Aug. 13, 1974

[54] DUAL FIELD OF VIEW INTRUSION DETECTOR

[75] Inventor: Frank Schwarz, Stamford, Conn.

[73] Assignee: Barnes Engineering Company, Stamford, Conn.

[22] Filed: Oct. 3, 1973

[21] Appl. No.: 403,228

[52] U.S. Cl. ................. 250/338, 250/332, 250/342, 250/344
[51] Int. Cl. ................. G01j 5/12
[58] Field of Search ........... 250/332, 334, 338, 342, 250/344

[56] References Cited

UNITED STATES PATENTS

| | | | |
|---|---|---|---|
| 3,703,718 | 11/1972 | Berman | 250/338 |
| 3,708,667 | 1/1973 | Denis et al. | 250/338 |
| 3,727,057 | 4/1973 | Higby et al. | 250/338 |
| 3,792,275 | 2/1974 | Leftwich et al. | 250/338 |

*Primary Examiner*—Archie R. Borchelt
*Attorney, Agent, or Firm*—Robert Ames Norton; Joseph Levinson

[57] ABSTRACT

An intrusion detector for detecting movement of bodies radiating in the infrared in a space to be monitored is a combination of an infrared detector such as a thermopile, thermistor, or pyroelectric detector in which a series of all-active thermocouple junctions or pyroelectric detectors connected in opposition is arranged in alignment so that columns of junctions are of alternating polarity, so that an object moving in the space and radiating in the infrared, the image of which moves across the columns, will produce an AC signal which is then amplified and processed electronically to produce an alarm. The electronic circuits, including logic, are well known, and their particular design forms no part of the present invention. Instead of having a single optical system, such as, for example, a germanium lens, imaging the body on the plane of the detector, there are two optical systems, preferably on different focal lengths, one of which images on the front of the detector and the other on the back. The imaging on the back may be reflective, so that intensified images are produced, or it may employ a refracting element for imaging on the back of the detector. In the former case, sensitivity is greatly increased, for example, doubled, and in the second case, which can be used for a detector in long, narrow spaces such as corridors, the sensor can be placed in the middle and will respond to moving bodies on either side of the detector. If it is desired to have a denser coverage of image so that to some extent the spaces between the columns are filled in, in this case the optics is adjusted so that a slightly different field of view is imaged on the back of the detector. This means that a moving object would have to be much smaller or move a lesser distance in order not to strike columns. The sensitivity of course is not increased in such a case.

10 Claims, 4 Drawing Figures

6
5
9
10
8
7

DUAL FIELD OF VIEW INTRUSION DETECTOR

BACKGROUND OF THE INVENTION

All active junction thermopiles with successive junctions in opposition and arranged so that columns are formed, the columns being of alternate polarity, are described in my earlier U.S. Pat. No. 3,760,399, issued Sept. 18, 1973. A modified detector with variable junction spacings in columns is described in the application of Leftwich and Ensor, Ser. No. 317,983, filed Dec. 26, 1972, now U.S. Pat. No. 3,792,275 the variation in spacing permitting different sensitivities in different directions or zones in the space to be monitored. Both the above patent and the cited application are assigned to the assignee of the present application.

As is usually the case in infrared detectors, there are limits on sensitivity and signal-to-noise ratios. In the case of intrusion detectors this has resulted in definite limits in the dimensions of the space to be monitored, for example, with a given detector an intrusion detector may have good sensitivity and signal-to-noise ratio for ranges from 30 to 50 feet. It should be noted that the alternate polarity pulse detection when the image of an object crosses two columns permits a complete elimination of false alarms from over-all changes in radiation. For example, with infrared radiation in the spectral range of 7–14$\mu$, which is the range for human beings and other animals, changes in the ambient light in the space to be monitored, which of course changes the intensity of the infrared over-all, has no effect on the detector, which detects only movement in the form of an AC signal. The all-active junction thermopiles with alternate junctions in opposition and arranged in rows, represent an important improvement in intrusion detectors. However, there are still limitations in sensitivity and distance over which reliable detection can take place, and it is with an improved detector of the general type described in the two patent applications that the present invention deals.

SUMMARY OF THE INVENTION

In the present invention there are two optical systems, often of different focal length, one system imaging the target or moving object on one side of the detector and the other on the other side. The detector, of course, must be mounted on edge, usually in a ring, so that both sides can receive radiation. As described in the earlier applications above referred to, the optical systems may be provided with suitable filters, for example, a cut-on coating for the germanium lens which does not pass infrared shorter than about 6 or 7$\mu$. This prevents false alarms from flashing lights at much shorter wavelengths. The same considerations apply in the optical systems of the present invention.

Since there are two optical systems in the present invention, two variants are possible. In the one case the front surface of the detector receives radiation, for example through a germanium lens, and a reflective collecting optic images objects from the same side onto the back of the detector, which can, with suitable arrangement, increase the sensitivity, for example to 70 feet or more. Where the reflective optic is behind the detector it may be of a different focal length than the germanium lens, for example a longer focal length, so that a narrower field of view concentrates more energy and therefore permits reliable detection to greater distances, for example in on-axis or near-axis beams. As it is quite common to arrange an intrusion detector in a corner of a room or other space to be monitored, the diagonal of the space represents the greatest distance, and if the detector optics are suitably aligned, this may be the direction in which the longer focus reflecting optics receives energy from a narrower field of view. This further increases the sensitivity and the reliable range. For example, if the germanium lens has a field of view of 70°, the reflecting optics may have a field of view of 30° or 35°. It is of course possible to have the reflecting optics cover the same field of view as the refracting optics, and in such case there will be an increase in sensitivity which may increase the reliable detection distance from 30–40 feet to 70 feet or more.

If the optics do not image fields of view on both back and front of the detector, it is possible to have a different result. The columns on the detector described have finite spaces between them. This means that certain portions of the field of view are imaged in the spaces, and so this leaves small areas which are not covered, for example if a would-be intruder knew exactly what fields of view would not be imaged on columns, it is at least theoretically possible that he could penetrate the unsupervised space for a certain distance without setting off an alarm. If the optics are arranged so that some parts of the field of view are imaged on the front columns of the detector and other adjacent ones on the back ones, there is a denser coverage, and this leaves no loophole. Of course, where this variant is used, there will not be an increase in sensitivity of all fields of view. It should be noticed that if the focal lengths of the optics are exact multiples of each other, there may be a filling in, as just described, but some fields of view would be coincident and therefore result in more energy being incident on the detector. This can result in certain fields of view providing more energy on the detector, for example those on a longer path. Whether or not there will be complete coincidence or only partial depends on the orientation of the optics, and on their respective focal lengths.

It should be noted that there is a selective difference in sensitivity in the detector described in the Leftwich and Ensor application by having closer spacing of the detector junctions and/or a difference in size of each detector junction receiving images from the direction in which the target is at the greatest distance. For other beams from shorter distances, the more widely spaced junctions receive adequate energy. It is not just a question of over-all sensitivity, which might otherwise dictate that the whole of the detector have uniformly closely spaced junctions. However, when this is done, the larger number of junctions increases the resistance for the total thermopile, and hence the unavoidable increase in noise. The Leftwich and Ensor detector permits a useful selection of greater energy where it is needed without excessive increase in noise. The present invention can be used with a Leftwich and Ensor detector, and for many purposes this is preferred, and will be described, but the particular detector is not the essence of the present invention, and it may be used with detectors of uniform spacing of junctions, or any other form which may be desired.

The second variant of the present invention arranges the second set of optics, which may be either reflective or refractive, so that there is imaged on the back of the detector objects moving in back of the detector. This permits special instruments, for example for very long narrow spaces such as corridors, halls, and the like, where the detector can be more or less centrally mounted, but the distance that has to be covered is halved. This permits operation in long spaces, for example up to 100 feet or more. Obviously, of course, more than one detector may be used, for example two, with one mounted a fourth of the length of a long space, and the other three fourths. A valuable flexibility is thus possible in the present invention. The multiple optics just described may be mounted at any part in a wall of an elongated space. It is often desirable to mount them rather high on a wall, for example at or near the point where the wall meets the ceiling. This requires some downward tilting of the optic, and will be described in a diagrammatic illustration of this variant of the invention in the description of specific embodiments below. When more than one detector is used, it may be desirable in some cases to modify the electronic processing circuits. Thus, there may be separate circuits for each detector, which would then give the possibility of some general location of the moving body, or with other configurations, detectors can be arranged to give signals to the same processing circuit. In such cases, of course, an alarm would be given regardless of where a body moved. Since the particular design of the electronic circuits, including their logic circuits, is well known, their exact configuration does not constitute the distinction of the present invention over the prior art. They will therefore be shown purely diagrammatically.

It should be noted that the present invention is definitely a combination of the detectors with rows of opposing polarity, producing an AC signal. The broad idea of illuminating both front and back of an infrared detector is not new. For example, such a detector is described in the Falbel U.S. Pat. No. 3,348,058. The detector, of course, is quite different from the all-active junction detector with adjacent junctions in opposition and aligned to give rows of alternating polarity. It is only with such detectors, where intrusion detection can be simply and economically effected with a maximum reliability against false alarms, that the present invention is concerned. In other words, the present invention is a combination of elements, no one of which by itself and divorced from the others is necessarily new, which combination produces an improved result, namely the monitoring for movement of bodies at greater distances, or a higher density of projected fields. It is of course the combination of elements which constitutes the present invention.

The simplest, and for many purposes most desirable, form of detector is a thermopile, which has been described above, and which is also described in the Schwarz and Leftwich et al, applications above referred to. However, while any infrared detector which can receive energy both front and back is useful, for example thermistors and pyroelectric detectors, the invention will in general be described with the somewhat simpler and preferred thermopile, but it should be understood that other detectors, such as thermistors, and pyroelectric detectors, are included in broader aspects of the present invention. Of course, the electronic processing circuits which are used must be suitable for the particular signal produced from a particular type of detector. This is well known in electronics, and is merely mentioned for the sake of completeness.

Reference has been made to prevention or great minimizing of possible false alarms. For example, apart from the complete insensitivity to false alarms resulting from over-all change in ambient radiation, the electronic processing circuits may be provided with suitable time constants so that very short flashes do not activate the alarm. In this respect the situation is exactly the same for the earlier Schwarz and Leftwich et al, devices. One type of prevention or minimizing of false alarms deals with the situation where one wishes only to monitor movement of a larger body, such as a human being, and not the movement of a smaller body, such as a cat or a small dog, which of course are much lower to the floor and this can be effected by having the collecting optics slightly tilted so that they do not receive energy from objects at or very near floor level. This of course may have its price, as, if an intruder knows ahead of time the exact design of the intrusion detector, it is theoretically possible that he might crawl along the floor. However, since the detectors are completely passive and therefore do not betray their presence to an intruder, this may not be serious. Of course, if there is no tilt, an intruder cannot defeat the detector, at the expense, however, of a possibility of false alarms from small, low bodies such as cats and dogs. The particular compromise will be chosen in the light of all of the circumstances involved, and it is an advantage of the present invention that there is great selectivity of alignment of detectors and optics so that the best arrangement for any particular purpose can be achieved, and this does not involve a compromise because the increased sensitivity which is one of the principal advantages of the present invention is still retained.

Reference has been made to an intrusion detector. This is the most important use, but essentially the detector is detecting motions of a body in a particular space to be monitored, regardless of whether that body intruded or was originally in the space. Accordingly, while for simplicity the description will use the term intrusion detector, the claims will present broader language which does not limit them to a moving body which has actually intruded from outside into the space. Intrusion is by far the most important field of the present invention; however, there are possibilities where there is not actual intrusion, for example, a patient on a hospital bed who must not be allowed to move, as is sometimes the case after a cataract operation, may be imaged on the detector, and if movement takes place, or movement takes place beyond a minimum predetermined distance, an alarm can be sounded, and a nurse or other person may come in to prevent adverse effects. There are other possibilities where detection of motion of a body that has not intruded from outside may be of importance, and the abovementioned is merely to make sure that the present invention is not limited to detecting the motion of a body that has actually intruded physically into the space from the outside.

With multiple images on the two sides of the detector, there may occur in certain places a cancellation of energy, and if it is desired to eliminate or reduce this, it is very simple to slightly displace the optics imaging on the back of the detector so that certain lines which might otherwise represent energy cancellation or attenuation do not overlap. This is an added advantage that can be incorporated in the present invention.

DESCRIPTION OF THE PREFERRED EMBODIMENTS

Figure 1:
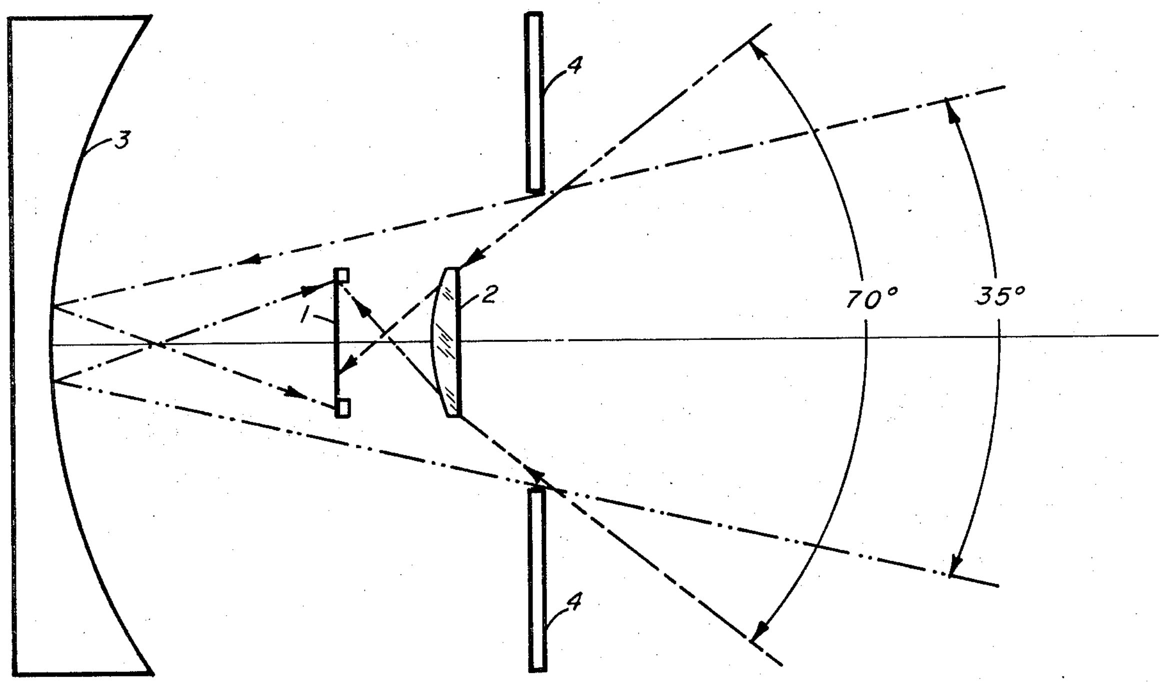
FIG. 1 is a diagrammatic vertical section through a detector imaging on both front and back of objects on one side of the detector.

FIG. 1 shows a detector (1) mounted between a lens (2) and a mirror (3). A field stop (4) limits the fields of view. It will be noted that the focal length of the two optics is not the same. The mirror (3) has a focal length double that of the lens (2). This can result in greater sensitivity for the narrow field of view which, in a common configuration where the detector is mounted in or near the corner of a room, the narrower field of view of the mirror (3) can be directed along the diagonal of the room, which is the longest path and requires maximum sensitivity, while nearer the corner it is desirable to have a much broader field of view so moving bodies are not lost. This is made possible by the shorter focal length of the lens (2).

Figure 4:
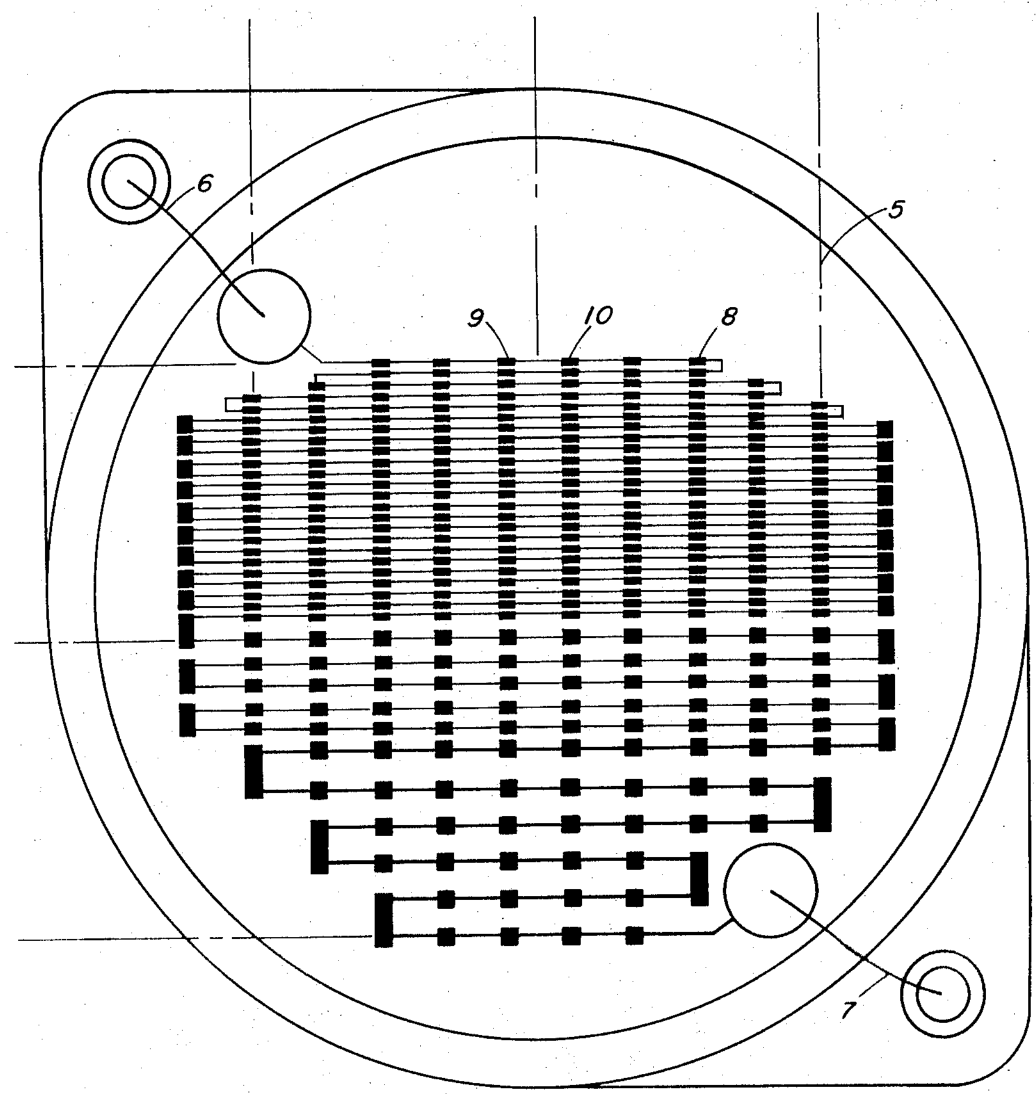
FIG. 4 is a plan view of a preferred form of detector.

FIG. 1 is essentially diagrammatic, showing only a few rays, and showing the detector without detailed structure. This detector may preferably be of the type described in the Leftwich and Ensor application referred to above, which is illustrated in FIG. 4. There is a detector mounting (5), greatly enlarged for clarity, two end leads (6) and (7) connected to a large number of thermocouples (8) which are all active and in series but arranged in columns, such as columns (9) and (10), all of the thermocouples in each column having the same polarity but being opposite in polarity, of course, to those of the adjacent columns. As this construction is shown in my earlier patent, and particularly in the Leftwich and Ensor patent, the thermocouples are shown diagrammatically, since they are of conventional structure, but the arrangement for connection of the thermocouples in series is required for the present invention. As described in the Leftwich and Ensor patent, the space of the thermocouples in the different columns varies along the length of the columns, so that a wider spacing, which appears at the bottom of the figure, occurs where lower sensitivity is required, and the closer spacing where higher sensitivity is required. The effect is as described in Leftwich and Ensor, and reference is made to that patent for specific description. In FIG. 1 the detector may be of a type as shown in FIG. 4, the illustration in FIG. 4, of course, being at right angles to the plane of the paper in FIG. 1.

Figure 2:
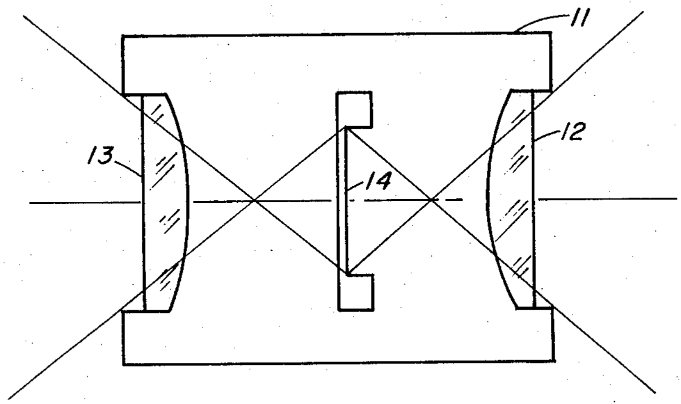
FIG. 2 is a section through detector and optics for long narrow spaces where a single detector can monitor in both directions.

FIG. 2 shows a mounting (11) in which two lenses (12) and (13) are mounted, the detector being of the type shown in FIG. 4. The illustration of FIG. 4 is, of course, at right angles to the plane of the paper in FIG. 2, just as it was when used in FIG. 1.

The detector system of FIG. 2 is mounted on the wall of a long space such as a hall, or of course could be mounted in the ceiling of the hall, in which case the optics have to be suitably tilted. The mounting in FIG. 2 cuts the path length over which an intruder is imaged and where, as has been described above, more than one sensor module is used, path length is still further decreased.

Figure 3:
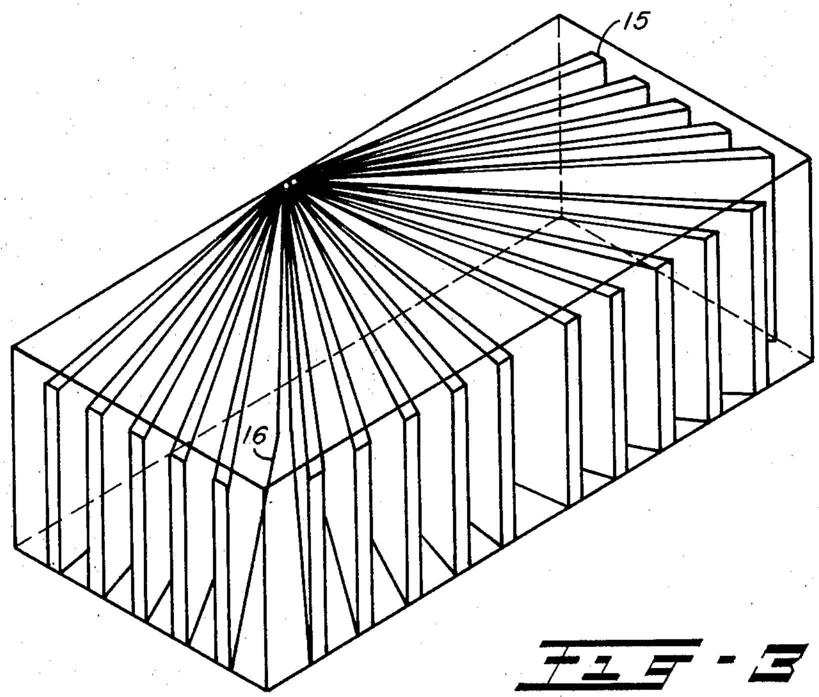
FIG. 3 is a perspective of the fields of view of detector and optics of the type of FIG. 2 mounted near the top of a wall and slightly tip-tilted. The figure is diagrammatic.

For convenience, protection of the detector systems against tampering, and to make them more inconspicuous, they are preferably mounted near the top of a wall. This mounting is illustrated purely diagrammatically in FIG. 3. The fields of view are shown at (15), each one imaged on one of the columns of the detector system. As illustrated, the detector would have ten columns with twenty fields of view, half being imaged on the columns on one side of the detector and half on the other. The ten columns, also illustrated in FIG. 4, is a matter of choice; detector systems with less than ten columns or more than ten columns being usable, and the number being chosen for the particular requirements of an installation. The optics are of course tilted down somewhat, and this can be seen in one of the fields of view where an edge strikes the floor at (16). The same is true of all the other fields of view, but the points are not shown as this would result in a confusing number of lines. As has been described above, the orientation, including tilting of the optics, is chosen for best coverage in any particular installation, and FIG. 3 should therefore be considered as a purely diagrammatic illustration. Each field of view which is imaged is in fact a three-dimensional structure, as is clearly seen in FIG. 3.

As described above and in the Leftwich and Ensor patent and my earlier patent, all of the junctions in the thermopile are active. This does not show in detail in FIG. 4, as the thermopile elements and their linkage are connected in the usual manner, but the junctions are so arranged that the columns are of opposite polarity to adjacent columns.

I claim:

1. A detector or detector system for detecting motion of bodies which emit infrared radiation comprising, in combination a. a transparent detector having a plurality of allactive detection elements arranged in series and aligned to form rows and columns, each column having the same polarity and the columns alternating the polarity, and b. two optical collecting systems, one imaging a moving body on one side of the detector, and the other on the opposite side.

2. A motion detector according to claim 1 in which the optical collecting system images a body on front and back of the detector, the body being on one side of the detector whereby the dual images can reinforce responses, or increase the density of fields of view imaging to reduce spacing whereby gaps in the fields of view imaged on particular columns are minimized.

3. A motion detector according to claim 1 in which one of the optical collecting systems images a body on one side of the detector, and the other images a moving body on the opposite side, whereby central location of the detector makes possible adequate signal from a longer, narrow space.

4. A detector according to claim 1 in which the detector elements are thermoelectric junctions forming a thermopile.

5. A detector according to claim 2 in which the detector elements are thermoelectric junctions forming a thermopile.

6. A detector according to claim 3 in which the detector elements are thermoelectric junctions forming a thermopile.

7. A detector according to claim 4 in which the density and spacing of elements are varied so that on one portion of the detector the sensitivity is greater than on others, whereby the maximum density and hence sensitivity may receive images from a direction which is the greatest direction of a particular space to be monitored and hence longest path, and the other zones of lesser density are positioned to receive radiation from shorter paths.

8. A detector according to claim 5 in which the density and spacing of elements are varied so that on one portion of the detector the sensitivity is greater than on others, whereby the maximum density and hence sensitivity may receive images from a direction which is the greatest direction of a particular space to be monitored and hence longest path, and the other zones of lesser density are positioned to receive radiation from shorter paths.

9. A detector according to claim 6 in which the density and spacing of elements are varied so that on one portion of the detector the sensitivity is greater than on others, whereby the maximum density and hence sensitivity may receive images from a direction which is the greatest direction of a particular space to be monitored and hence longest path, and the other zones of lesser density are positioned to receive radiation from shorter paths.

10. An instrument according to claim 2 in which the collecting optics imaging on the rear of the detector are laterally somewhat offset to prevent undue attenuation between rows.

* * * * *